United States Patent
Nagatsuka et al.

(10) Patent No.: US 10,838,786 B2
(45) Date of Patent: Nov. 17, 2020

(54) EMBEDDED SYSTEM, EMBEDDED SYSTEM CONTROL METHOD AND DATA CONSISTENCY JUDGMENT METHOD

(71) Applicant: MITSUBISHI ELECTRIC CORPORATION, Tokyo (JP)

(72) Inventors: Tomoyuki Nagatsuka, Tokyo (JP); Yoshiaki Katayama, Tokyo (JP); Tsutomu Motohama, Tokyo (JP); Yusuke Shimai, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/316,770

(22) PCT Filed: Sep. 5, 2016

(86) PCT No.: PCT/JP2016/075944
§ 371 (c)(1),
(2) Date: Jan. 10, 2019

(87) PCT Pub. No.: WO2018/042644
PCT Pub. Date: Mar. 8, 2018

(65) Prior Publication Data
US 2019/0227858 A1    Jul. 25, 2019

(51) Int. Cl.
*G06F 9/54* (2006.01)
(52) U.S. Cl.
CPC ............ *G06F 9/544* (2013.01); *G06F 9/54* (2013.01)
(58) Field of Classification Search
None
See application file for complete search history.

(56) References Cited

U.S. PATENT DOCUMENTS

| 6,418,061 B1* | 7/2002 | Kitazaki |
| 2010/0199044 A1 | 8/2010 | Kazama |
| 2013/0031311 A1 | 1/2013 | Kazama |

FOREIGN PATENT DOCUMENTS

| JP | H05-20146 U | 3/1993 |
| JP | H05-158892 A | 6/1993 |
| JP | H08-286953 A | 11/1996 |
| JP | 2004-094931 A | 3/2004 |
| JP | 2010-176505 A | 8/2010 |
| JP | 2014-085820 A | 5/2014 |

OTHER PUBLICATIONS

International Search Report for PCT/JP2016/075944 (PCT/ISA/210) dated Oct. 11, 2016.

* cited by examiner

*Primary Examiner* — Syed A Roni
(74) *Attorney, Agent, or Firm* — Birch, Stewart, Kolasch & Birch, LLP

(57) ABSTRACT

The present invention is provided with an embedded system (100) capable of performing control without any malfunction is provided, by including processing circuitry configured to: start a reading process; assign a read identification (ID) for each reading process, and to update a read ID number indicating the number of assigned read IDs; read communication data; and acquire, upon finishing a read process, a data writing-in-progress flag indicating whether a writing process is being performed, and a writing time identification (ID) number indicating the read ID number at the time of a data writing process, and to judge the consistency of the read data read, based on the data writing-in-progress flag, the read IDs, and a writing time read ID number.

11 Claims, 22 Drawing Sheets

Fig. 3

|  | COMMON DATA ADDRESS INSIDE COMMUNICATION DATA DATABASE 131 | COMMON DATA SIZE INSIDE COMMUNICATION DATA DATABASE 131 |
|---|---|---|
| DATA 1 | H' 000400 | 2 BYTE |
| DATA 2 | H' 000402 | 4 BYTE |
| ... | ... | ... |
| DATA N | H' 000564 | 1 BYTE |

Fig. 4

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig. 6

| READ ID | SET OF READ DATA |
|---------|------------------|
| 1 | DATA 1, DATA 2, DATA 5 |
| 2 | DATA 3, DATA 4 |
|  |  |
|  |  |

Fig. 8

| WRITE ID | SET OF WRITE DATA |
|---|---|
| 1 | DATA 1, DATA 3, DATA 6 |
| 2 | DATA 2, DATA 4, DATA 5 |
|  |  |
|  |  |

Fig. 9

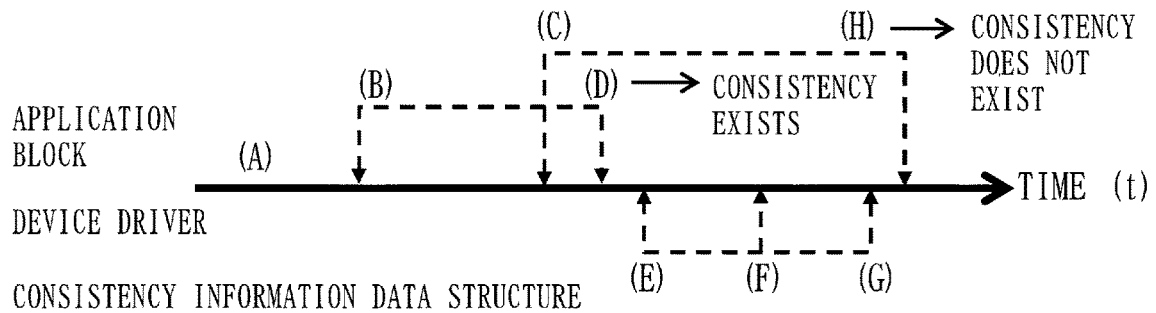

CONSISTENCY INFORMATION DATA STRUCTURE
(A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 1 | 0 |

(C) START READING [READ ID = 2]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 2 | 2 | 0 |

(D) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 2 | 0 |

(E) START WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 2 | 0 |

(F) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 2 COPY VALUE | 2 |

(G) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 2 | 2 |

(H) FINISH READING [READ ID = 2]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.10

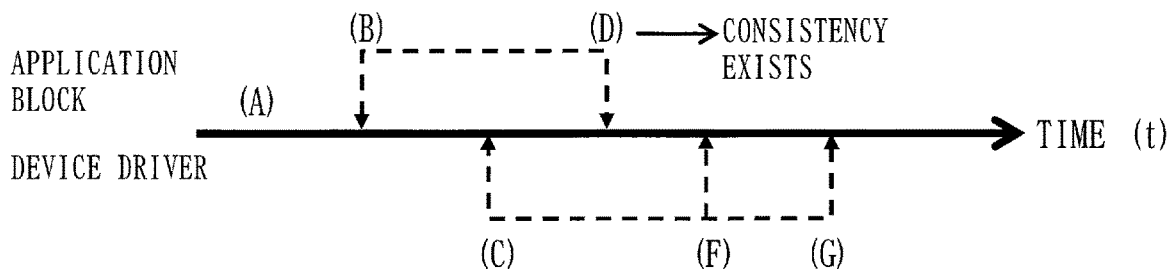

CONSISTENCY INFORMATION DATA STRUCTURE (A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 1 | 0 |

(C) START READING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 1 | 1 | 0 |

(D) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(E) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 0 | 0 COPY VALUE | 0 |

(F) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.11

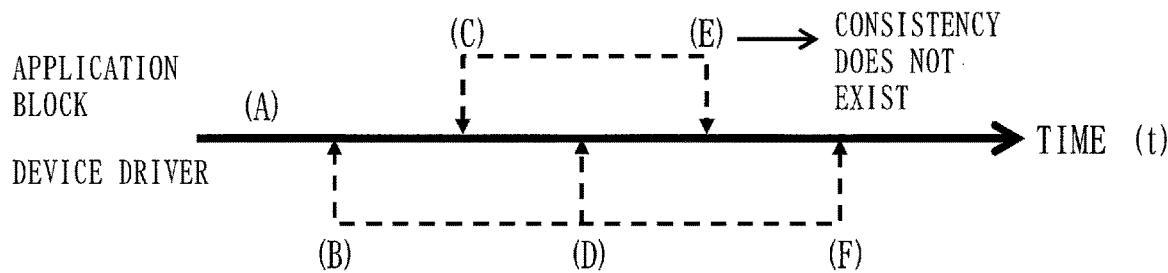

CONSISTENCY INFORMATION DATA STRUCTURE
(A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 0 | 0 | 0 |

(C) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 1 | 1 | 0 |

(D) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 COPY VALUE | 1 |

(E) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 0 | 0 | 0 |

(F) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.12

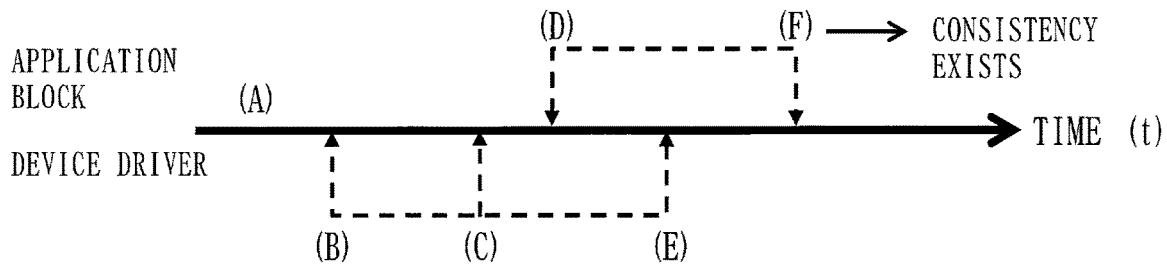

CONSISTENCY INFORMATION DATA STRUCTURE (A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 0 | 0 | 0 |

(C) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 0 | 0 —COPY VALUE→ 0 |  |

(D) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 | 0 |

(E) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 1 | 0 |

(F) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.13

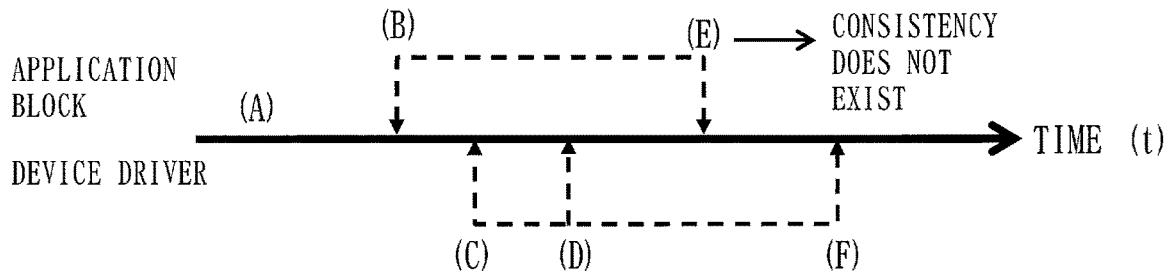

CONSISTENCY INFORMATION DATA STRUCTURE (A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 1 | 0 |

(C) START READING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 1 | 1 | 0 |

(D) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 COPY VALUE | 1 |

(E) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 0 | 0 | 0 |

(F) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.14

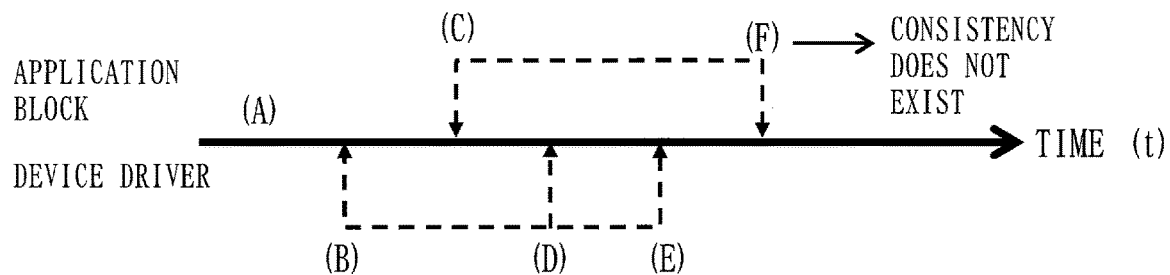

CONSISTENCY INFORMATION DATA STRUCTURE (A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 0 | 0 | 0 |

(C) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 1 | 1 | 0 |

(D) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 COPY VALUE → 1 |  |

(E) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | →FALSE | 1 | 1 | →1 |

(F) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.15

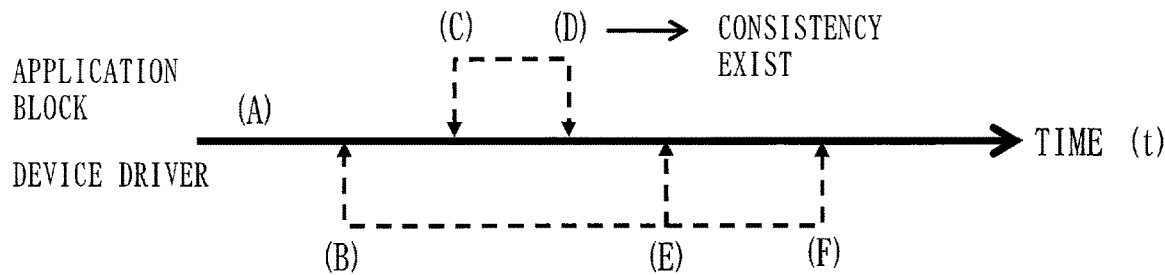

CONSISTENCY INFORMATION DATA STRUCTURE (A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 0 | 0 | 0 |

(C) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 1 | 1 | 0 |

(D) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 0 | 0 | 0 |

(E) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 0 | 0 COPY VALUE | 0 |

(F) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.16

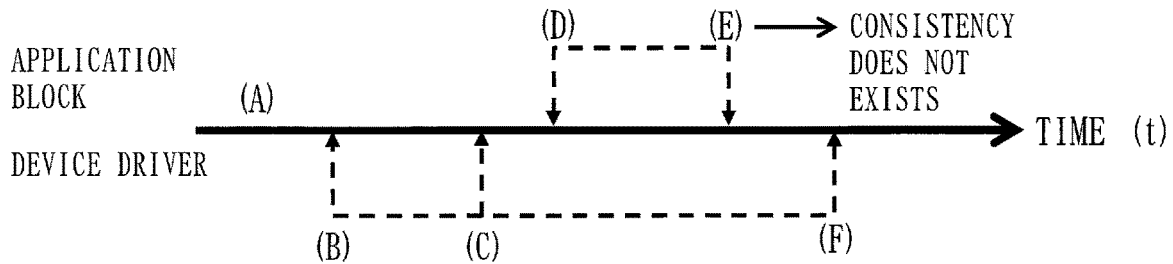

CONSISTENCY INFORMATION DATA STRUCTURE (A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 0 | 0 | 0 |

(C) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 0 | 0 —COPY VALUE→ | 0 |

(D) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 | 0 |

(E) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 0 | 0 | 0 |

(F) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.17

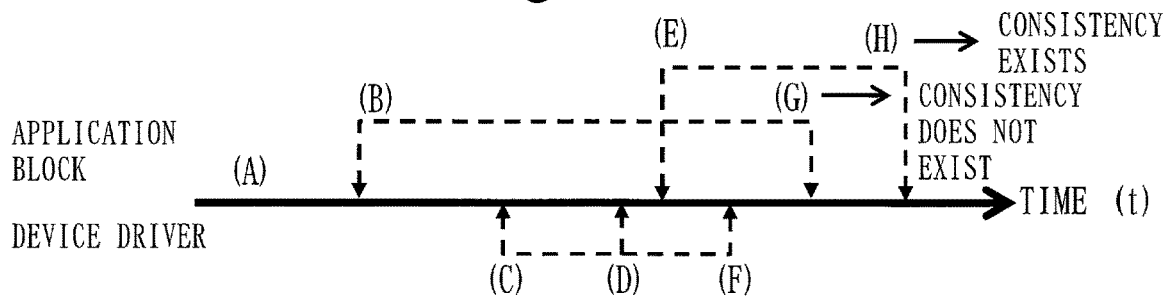

CONSISTENCY INFORMATION DATA STRUCTURE (A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 1 | 0 |

(C) START WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 1 | 1 | 0 |

(D) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 COPY VALUE → 1 |  |

(E) START READING [READ ID = 2]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 2 | 2 | 1 |

(F) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 2 | 2 | 1 |

(G) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 2 | 1 |

(H) FINISH READING [READ ID = 2]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.18

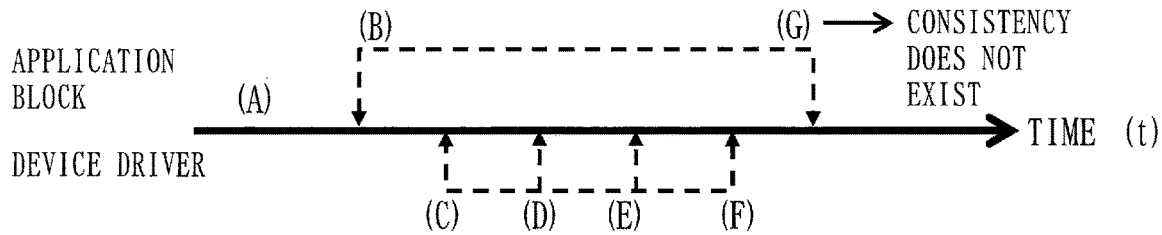

CONSISTENCY INFORMATION DATA STRUCTURE
(A) PRECONDITION

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

(B) START READING [READ ID =1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 1 | 0 |

(C) START WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | FALSE | 1 | 1 | 0 |

(D) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 | COPY VALUE → 1 |

E) WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 1 | TRUE | 1 | 1 | COPY VALUE → 1 |

(F) FINISH WRITING

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 1 | 1 | 1 |

(G) FINISH READING [READ ID = 1]

| WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|
| 0 | FALSE | 0 | 0 | 0 |

Fig.21

| | SET OF READ DATA |
|---|---|
| GROUP 1 | DATA 1, DATA 3, ⋯ |
| GROUP 2 | DATA 2, DATA 4, ⋯ |
| GROUP 3 | DATA 6, DATA 8, ⋯ |
| GROUP 4 | DATA 5, DATA 7, ⋯ |

Fig. 22

| | WRITE-START COUNT | DATA WRITING-IN-PROGRESS FLAG | READING-IN-PROGRESS ID NUMBER | READ ID NUMBER | WRITING TIME ID NUMBER |
|---|---|---|---|---|---|
| GROUP 1 | 0 | FALSE | 0 | 0 | 0 |
| GROUP 2 | 0 | FALSE | 0 | 0 | 0 |
| GROUP 3 | 0 | FALSE | 0 | 0 | 0 |
| GROUP 4 | 0 | FALSE | 0 | 0 | 0 |

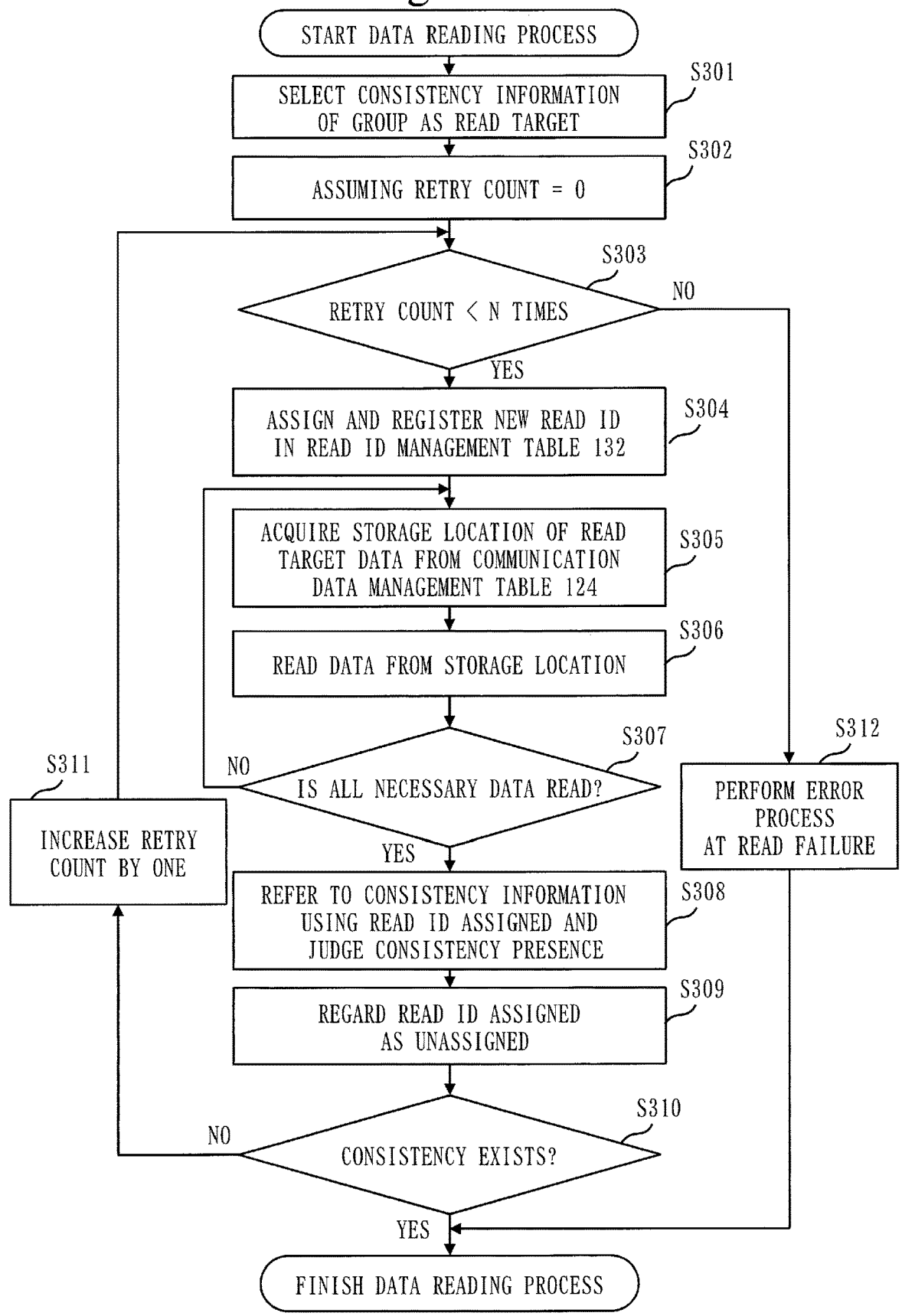

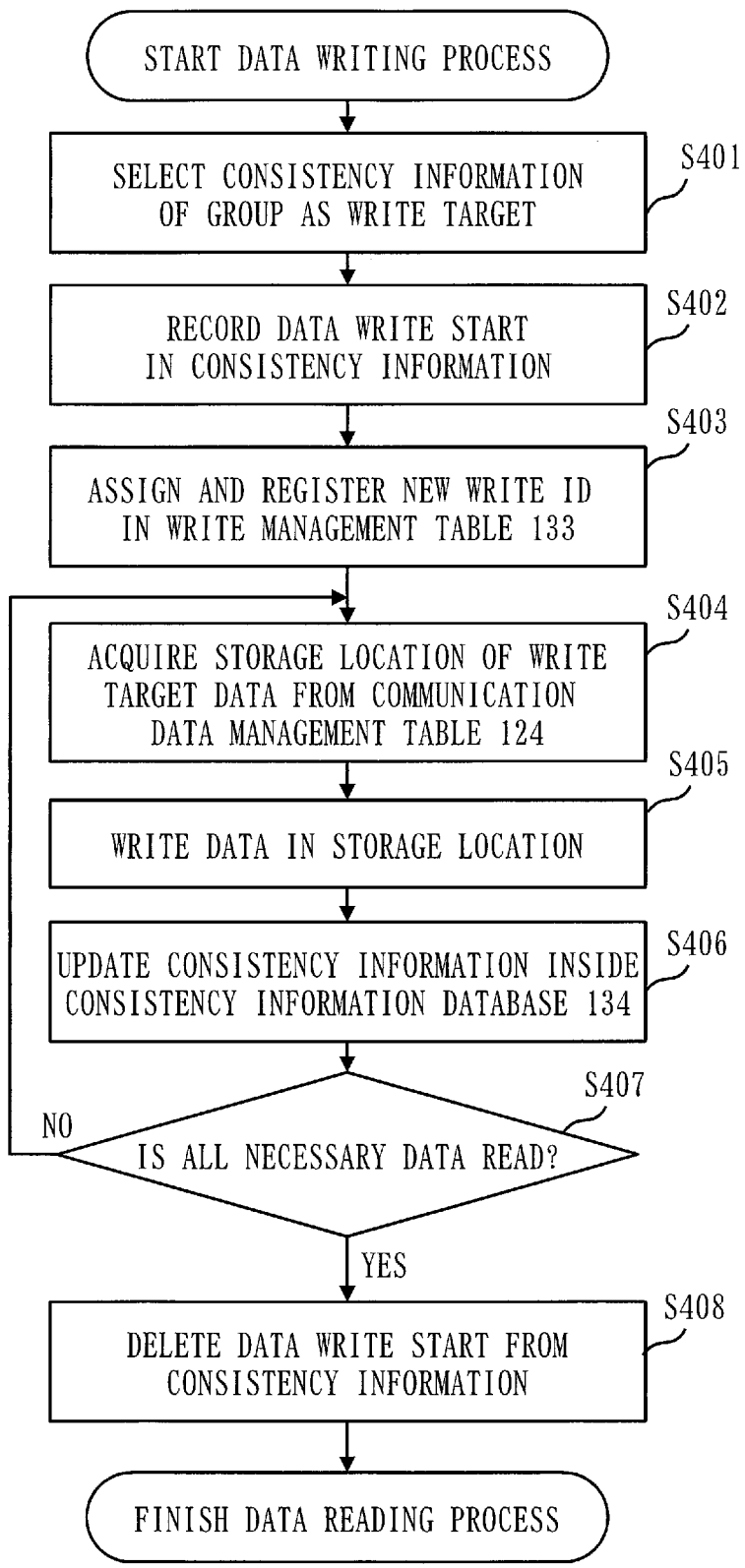

EMBEDDED SYSTEM, EMBEDDED SYSTEM CONTROL METHOD AND DATA CONSISTENCY JUDGMENT METHOD

TECHNICAL FIELD

The present invention relates to an embedded system equipped with a shared memory, a control method thereof, and a data consistency judgment method at the time of read processing into the shared memory.

BACKGROUND ART

Embedded systems that are embedded in equipment to mainly perform control for realizing functions of the equipment are widely used. In an embedded system, when it is necessary for a plurality of functions (software or hardware) that the embedded system is equipped with to access common data (hereinafter called shared data), target data is stored in a specific memory area (hereinafter called a shared memory area) shared by the pertinent plurality of functions. For example, data received by a communication device of an embedded system is used for control of equipment, received data is written in a shared memory area by software (hereinafter called a device driver) to control the communication device, and data of the pertinent area is read by equipment control software (hereinafter called application software). By this scheme, data inside the shared memory area is consistently kept updated, and it is possible for the application software to operate by reading the received data inside the shared memory area.

In this scheme, the timing to read received data is at the time when the application software needs data, and the timing to write the received data into the shared memory area is at the time when communication packets are received from external equipment; thus the timings are respectively independent. Therefore, if received data is read while the received data is being written into the shared memory, inconsistency may occur in the data read by the application software.

In this manner, it is commonly performed exclusive processing to prevent reading and writing of shared data from occurring at the same time, and to inhibit a third person from accessing to the same data while the shared data is accessed so that inconsistency does not occur in the data read by the application software. As a specific method, it is commonly used a method to exclude write and read of data by acquiring the lock at the time of access to the share memory area. By using this method, a lock is acquired before a device driver writes received data into the shared memory area, and the lock is released after writing into the shared memory area. The lock is acquired before reading the received data from the application software, and the lock is released after reading. In this manner, it is possible to preferentially access the shared memory area without being interrupted in the middle by acquiring the lock beforehand, and shared data is not used by the application software during the update.

However, by the exclusive method, when reading of received data by the application software precedes writing of the received data by the device driver, there is a possibility that a write process of the received data into the share memory area by the device driver may be postponed for a long time. The device driver operates based on a strict time constraint specified by a communication device or a communication protocol, and when the write process is postponed until the processing by the application software is completed as described above, there is a problem that the communication may not be continued, and a malfunction may occur.

In order to solve the problem as described above, it is required a data reading method whereby writing of received data into a shared memory area is not postponed until reading of data from the share memory area is completed, and inconsistency does not occur in the data read from the shared memory area.

As such a reading method, it is proposed a method to judge consistency of data written in a shared memory area at the time of reading data by using an identification symbol added to received data (Patent Literature 1). In this method, same identification symbols are added to a head and an end of data at the time of writing the data into the shared memory area, and at the time of reading, the identification symbols at the head and the end of the target data are read first, and data consistency is judged by match or mismatch. In a case of match, data is read by considering that data writing is completed, and in a case of mismatch, data reading is postponed until writing is completed considering that data writing is in progress.

Further, it is proposed a method to realize exclusion by holding a correspondence relation table of received data names and locations where the received data is stored, and by updating the correspondence relation table after data writing is completed (Patent Literature 2). In this method, at the time of writing into a shared memory area, data is written in an unused area secured beforehand in the area, and after the writing is completed, the correspondence relation table is updated, and the data storage location is changed to a latest state. In this manner, it is possible to read old data even when writing is in progress at the time of reading, since the correspondence relation table has not been updated yet, and to read new data after the writing is completed, since the correspondence relation table has been updated. Therefore, it is possible to perform writing and reading processes independently.

CITATION LIST

Patent Literature

Patent Literature 1: JP 05-20146 U
Patent Literature 2: JP 05-158892 A

SUMMARY OF INVENTION

Technical Problem

In the technique described in conventional Patent Literature 1, since consistency is judged by the identification symbols added to respective pieces of data, there is a problem that consistency can be only judged in units of data, and consistency cannot be judged in a case wherein a plurality of pieces of data hold meanings in combination.

Here, as an example of a case wherein a plurality of pieces of data hold meanings in combination, there is a case, for example, wherein in a room air conditioner, a piece of data A indicating an operation mode (cooling, heating, etc.) and a piece of data B indicating a set temperature (28 degrees Celcius, etc.) are received from a wireless remote controller, and respective pieces of data are written into a shared memory area by a device driver.

In this example, when data originally written in the shared memory area is "data A=heating, data B=25° C.", and "data A=cooling, data B=28° C." is received from the wireless remote controller, if received data is read from the shared memory area by application software in a state wherein only writing of data A is completed, "data A=cooling, data B=25° C." is read, and consistency between data A and data B is lost, which results in a malfunction.

Also in the technique described in Patent Literature 1, it is possible to judge consistency by treating a plurality of pieces of data as one piece of data; however, the capacity of data to be read in or written into becomes large, and even in a case wherein it is desired to update only a part of the data, it is necessary to write the whole data, which lowers efficiency of processing.

Further, also in the technique described in Patent Literature 2, since correspondence relation for each data is used, there is a problem that it is only possible to judge consistency in units of data, similarly to Patent Literature 1.

The present invention is provided to solve the problems as described above, and is aimed at realizing an embedded system which makes it possible to confirm consistency of a plurality of pieces of data read in reading data from a shared memory.

Solution to Problem

In order to solve the problems as described above, and to attain the aim, an embedded system according to one aspect of the present invention includes:

a read start means to start a reading process of data performed by an application unit;

a read matching start means to assign a read ID to each reading process started by the read start means, and to update a read ID number indicating the number of read IDs assigned;

a reading means to read the data;

a read finish means to finish reading of the data by the reading means; and a read matching finish means to acquire the read ID, a data writing-in-progress flag to indicate whether a writing process is in progress, and a writing time ID number indicating the read ID number at the time of a data writing process, and to judge consistency of the data read, based on the data writing-in-progress flag, the read ID and the writing time ID number.

Further, an embedded system control method according to one aspect of the present invention includes:

a read ID assignment step to assign a read ID to identify a reading process at the time of starting a data reading process;

a data reading step to read data from a shared memory;

a consistency information acquisition step to acquire consistency information including a read ID number being the number of read IDs assigned form the shared memory at the time of finishing the data reading step, a data writing-in-progress flag being a flag to denote whether a data writing process into the shared memory is in progress, and a writing time ID number being the read ID number at the time of the data writing process into the shared memory; and a consistency judgment step to judge that consistency exists in the data read in the data reading step when the data writing-in-progress flag acquired in the consistency information acquisition step is not writing-in-progress, and the read ID is larger than the writing time ID number.

Further, a data consistency judgment method according to one aspect of the present invention judges whether consistency exists in data read, based on:

a read ID assigned to identify a read start process at the time of starting a data reading process from a shared memory;

a read ID number indicating the number of read IDs assigned;

a data writing-in-progress flag indicating whether data writing into the shared memory is in progress; and a writing time ID number indicating the read ID number at the time of a data writing process.

Further, a data consistency judgement method according to one aspect of the present invention judges, at the time of finishing a data reading process from the shared memory, whether consistency exists in the data read, based on whether data writing into the shared memory is in progress or not, what number the data reading process has been started, and up to what number reading process started is included in a reading process that has been performed at the time of a data writing process into the shared memory.

Advantageous Effects of Invention

Since the embedded system according to the present invention has the configuration as described above, it is possible to insure that a plurality of pieces of data read from a shared memory are consistent, and to perform control without any malfunction due to inconsistency of data read.

BRIEF DESCRIPTION OF DRAWINGS

FIG. 3 is a table structure diagram illustrating one example of a communication data management table structure inside a communication data management table 124 according to the first embodiment of the present invention.

FIG. 4 is a data structure diagram illustrating one example of a data structure of consistency information inside a consistency information database 134 according to the first embodiment of the present invention.

FIG. 6 is a table structure diagram illustrating one example of a read ID management table structure of a read ID management table 132 according to the first embodiment of the present invention.

FIG. 8 is a table structure diagram illustrating one example of a write ID management table structure inside a write ID management table 133 according to the first embodiment of the present invention.

FIG. 9 is an explanatory drawing illustrating one example of consistency presence judgment according to the first embodiment of the present invention.

FIG. 10 is an explanatory drawing illustrating one example of consistency presence judgment according to the first embodiment of the present invention.

FIG. 11 is an explanatory drawing illustrating one example of consistency presence judgment according to the first embodiment of the present invention.

FIG. 12 is an explanatory drawing illustrating one example of consistency presence judgment according to the first embodiment of the present invention.

FIG. 13 is an explanatory drawing illustrating one example of consistency presence judgment according to the first embodiment of the present invention.

FIG. 14 is an explanatory drawing illustrating one example of consistency presence judgment according to the first embodiment of the present invention.

FIG. 15 is an explanatory drawing illustrating one example of consistency presence judgment according to the first embodiment of the present invention.

FIG. 16 is an explanatory drawing illustrating one example of consistency presence judgment according to the first embodiment of the present invention.

FIG. 17 is an explanatory drawing illustrating one example of consistency presence judgment according to the first embodiment of the present invention.

FIG. 18 is an explanatory drawing illustrating one example of consistency presence judgment according to the first embodiment of the present invention.

FIG. 21 is a table structure diagram illustrating one example of a group classification management table structure inside a group classification management table 125 according to the second embodiment of the present invention.

FIG. 22 is a data structure diagram illustrating one example of a data structure of consistency information inside a consistency information database 134 according to the second embodiment of the present invention.

FIG. 23 is a flowchart illustrating one example of a processing sequence of a data reading processing unit 210 according to the second embodiment of the present invention.

FIG. 24 is a flowchart illustrating one example of a processing sequence of a data writing processing unit 240 according to the second embodiment of the present invention.

Hereinafter, explanation of embodiments of an embedded system according to the present invention is provided in detail based on diagrams. In the diagrams referenced below, the same signs are assigned to the same or corresponding parts. The present invention is not limited to these embodiments.

First Embodiment

Figure 1:
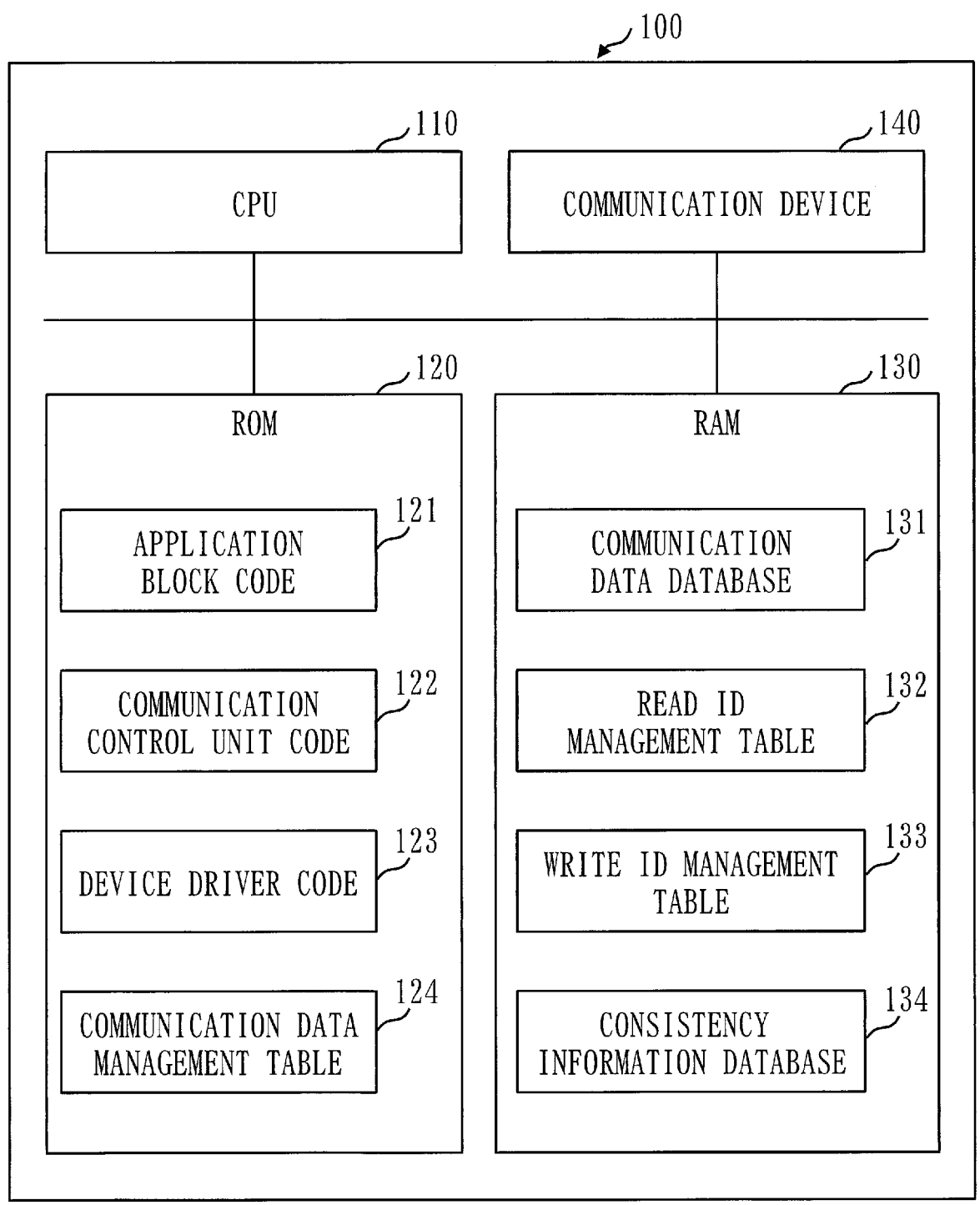
FIG. 1 is a configuration diagram illustrating one example of a system configuration of an embedded system 100 according to a first embodiment of the present invention.
Figure 2:
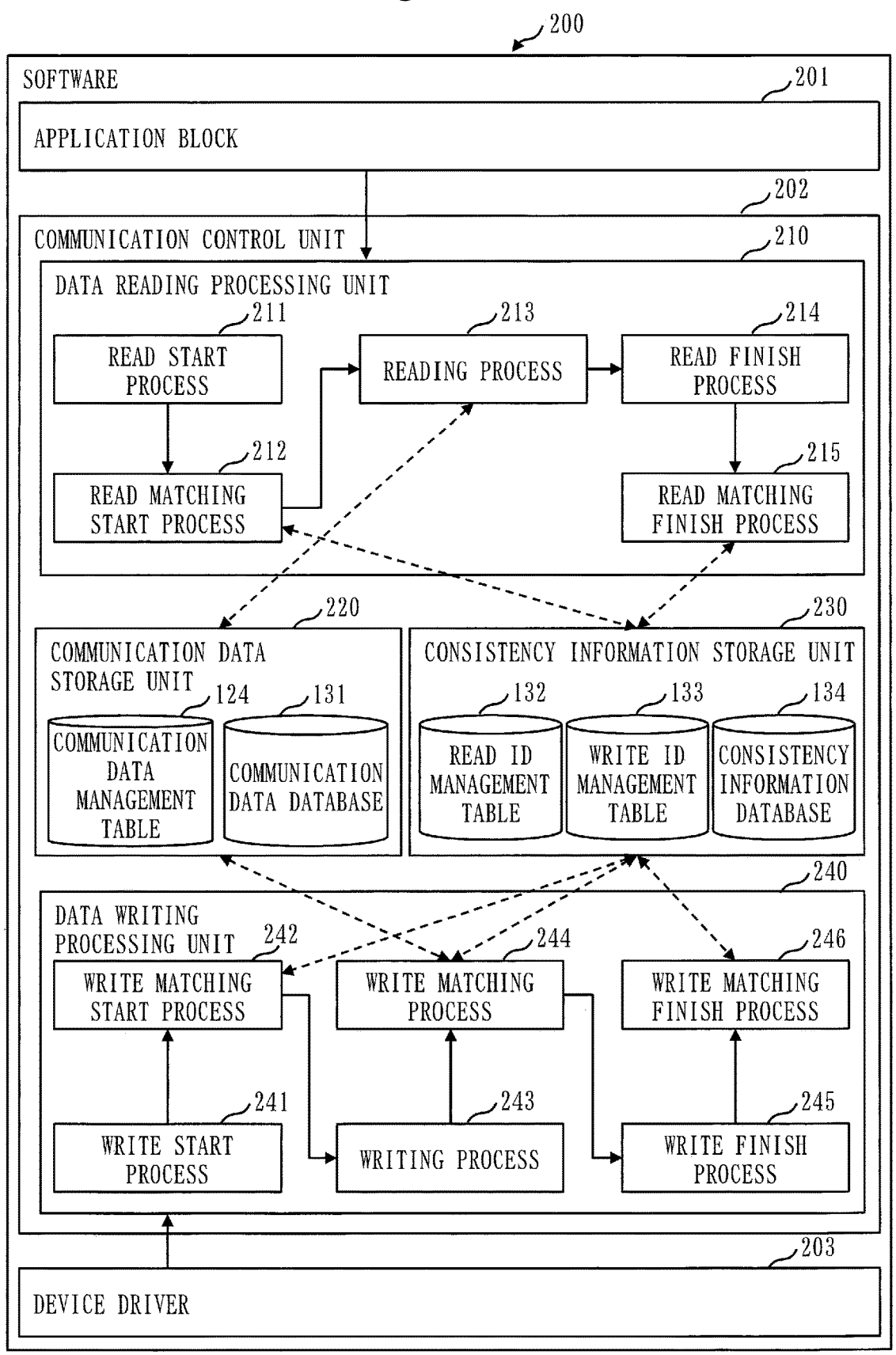
FIG. 2 is a configuration diagram illustrating one example of a software configuration of software 200 in an embedded system according to the first embodiment of the present invention.

FIG. 1 is a configuration diagram illustrating one example of a system configuration of an embedded system 100 according to the first embodiment of the present invention, and FIG. 2 is a configuration diagram illustrating one example of a software configuration of software 200 of an embedded system according to the first embodiment of the present invention.

In FIG. 1, the embedded system 100 is equipped with a central processing unit (CPU) 110, a read only memory (ROM) 120, a random access memory (RAM) 130 and a communication device 140, wherein the CPU 110 is a control unit to execute programs of respective code areas stored in the ROM 120, and to control reading and writing of data, the ROM 120 and the RAM 130 are shared memories to record data, and the communication device 140 is a communication unit to perform data transmission and reception with an external device such as a universal asynchronous receiver transmitter (UART), etc. Here, the ROM 120 and the RAM 130 will be described below in detail.

In FIG. 2, the software 200 is configured by an application block 201, a communication control unit 202 and a device driver 203, is stored in the ROM 120 and the RAM 130, and is executed on the CPU 110.

The application block 201 is application software (an application unit) created for each product or system, to read data from the communication control unit 202, and to perform control unique to the product or the system by the data read. The communication control unit 202 reads data from the ROM 120, or reads and writes data from and into the RAM 130, upon request from the application block 201 or the device driver 203. The device driver 203 performs communication processing specified by a communication protocol specified by a communication partner. The application block 201, the communication control unit 202 and the device driver 203 will be described below in detail.

The communication control unit 202 is configured by a data reading processing unit 210, a communication data storage unit 220, a consistency information storage unit 230 and a data writing processing unit 240.

The data reading processing unit 210 is configured by a read start process 211, a read matching start process 212, a reading process 213, a read finish process 214 and a read matching finish process 215, and the application block 201 is executed at the time data is read. Respective processes configuring the data reading processing unit 210 correspond to means to configure the embedded system 100. The read start process 211 is called from the application block 201 to start processing of reading data. The read matching start process 212 is called from the read start process 211 to update the consistency information storage unit 230 to a state indicating start reading data. The reading process 213 reads, from the communication data storage unit 220, data for which a reading request has been made from the application block 201. The read finish process 214 finishes the processing of reading data upon being called from the reading process 213. The read matching finish process 215 is called from the read finish process 214, updates the consistency information storage unit 230 to a state indicating finish of reading data. The update method of consistency information in the read matching start process 212 and the read matching finish process 215 will be described below in detail.

The communication data storage unit 220 is configured by the communication data management table 124 stored in the ROM 120 and the communication data database 131 stored in the RAM 130. The communication data management table 124 is a management table of data storage locations inside the communication data database 131, which is referenced in a reading process or a writing process of the data reading processing unit 210 and the data writing processing unit 240. The communication data database 131 is updated by the data writing processing unit 240 in an area where data received by the communication device 140 is stored, and is always kept up-to-date. The communication data database 131 may store not only received data but also transmitted data.

The consistency information storage unit 230 is configured by the read ID management table 132, the write ID management table 133 and the consistency information database 134 stored in the RAM 130. The read ID management table 132 is a management table of read IDs assigned for respective data reading processes from the communication data database 131 performed by the application block 201, and associated with read target data of respective read processes. The write ID management table 133 is a management table of write IDs assigned for respective data writing processes into the communication data database 131 performed by the device driver 203, and associated with write target data of respective writing processes. Further, the consistency information database 134 is a database to store consistency information for judging consistency of data read from the communication data database 131 by the application block 201.

The data writing processing unit 240 is configured by a write start process 241, a write matching start process 242, a writing process 243, a write matching process 244, a write finish process 245 and a write matching finish process 246, which are called from the device driver 203 at reception timing specified by a communication protocol. Here, respective processes configuring the data writing processing unit 240 correspond to means configuring the embedded system 100. The write start process 241 is called from the device driver 203, and starts writing processing of received data into the communication control unit 202. The write matching start process 242 is called from the write start process 241, and updates the consistency information storage unit 230 to a state indicating start of data writing. The writing process 243 is a process to write data received from external equipment by the device driver 203 into the communication data storage unit 220. The write matching process 244 is called from the writing process 243, and updates the consistency information storage unit 230 to a state indicating data writing. The write finish process 245 is called from the write matching process 244, and finishes the writing process of received data into the communication control unit 202. The write matching finish process 246 is called from the write finish process 245, and updates the consistency information storage unit 230 to a state indicating finish of data writing.

The ROM 120 stores the application block code 121, the communication control unit code 122 and the device driver code 123, being program codes respectively of the application block 201, the data reading processing unit 210 and the data writing processing unit 240 configuring the communication control unit 202, and the device driver 203, and the communication data management table 124 configuring the communication data storage unit. The data storage locations inside the communication data database 131 are managed in accordance with, for example, data addresses, and one example of the structure of the management table inside the communication data management table 124 is a management table wherein received data names, data addresses and data sizes indicating the sizes of data illustrated in FIG. 3 are associated with one another.

Further, the RAM 130 stores the communication data database 131 configuring the communication data storage unit, and the read ID management table 132, the write ID management table and the consistency information database 134 configuring the consistency information storage unit 230.

FIG. 4 is one example of a data structure diagram of consistency information for judging consistency inside the consistency information database 134, configured by a write-start count to retain the number of times data writing is started, a data writing-in-progress flag being a flag indicating whether data writing is in progress (state wherein writing is performed, and a writing executable state is maintained) into the communication data database 131, a read ID number to retain the number of read IDs assigned, a reading-in-progress ID number to retain the number of read IDs during data reading among the read IDs assigned, and a writing-time ID number to retain the number of read IDs at the time when data writing is performed.

The write-start count is incremented (+1) at the time when the write matching start process 242 is performed, and decremented (−1) at the time when the write matching finish process 246 is performed. The initial value is 0.

The data writing-in-progress flag becomes TRUE at the time when the write matching process 244 is performed, and becomes FALSE in a case wherein the write-start count decremented is 0 at the time when the write matching finish process 246 is performed. The initial value is FALSE.

The reading-in-progress ID number is incremented when the read matching start process 212 is performed, and decremented at the time when the read matching finish process 215 is performed. The initial value is 0.

The read ID number is incremented at the time when the read matching start process 212 is performed, and becomes 0 in a case wherein the reading-in-progress ID number decremented is 0 at the time when the read matching finish process 215 is performed. The initial value is 0. It is possible for the read ID number to count the number of reading processes in which reading processes are continuously performed without being disconnected.

Further, at the time when the read matching start process 212 is performed, a read ID number after increment is assigned to read IDs.

The assignment method of read IDs will be described below in detail.

The value of the read ID number is copied to the writing-time ID number at the time when the write matching process 244 is performed, and the writing-time ID number becomes 0 in a case wherein the read ID number becomes 0 at the time when the read matching finish process 215 is performed. The initial value is 0.

Next, operation will be discussed.

First, an overview will be given using FIG. 2. First, regarding the communication data database 131, operation of the data writing processing unit 240 is given priority over the operation of the data reading processing unit 210. For realizing the same, the data reading processing unit 210 and the data writing processing unit 240 are operated independently, and in a case wherein writing of received data is performed by the operation of the data writing processing unit 240 while data reading is in progress by the operation of the data reading processing unit 210, writing by the data writing processing unit 240 is regarded as success in writing, and reading by the data reading processing unit 210 is regarded as failure in reading since data read is inconsistent. At the time of reading failure, it may be applicable to make the data reading processing unit 210 be retried and repeated until received data read obtains consistency. If it is impossible to acquire received data having consistency even with a fixed number of times of retry, reading failure is notified to a caller of the data reading processing unit 210 as error processing. Hereinafter, a case wherein retry is performed will be described as an example.

Judgment of success or failure in reading is performed by read IDs. The read IDs are managed in the read ID management table 132 inside the consistency information storage unit 230, and are assigned at the time when a read matching start process 212 is performed. The read IDs once assigned become unassigned when a read matching finish process 215 paired with the read matching start process 212 is performed, and are not to be assigned again until all the read processes during processing are finished, i.e., until the read ID number becomes 0. The consistency information inside the consistency information database 134 is sequentially updated by performing the read matching start process 212, the read matching finish process 215, the write matching start process 242, the write matching process 244 and the write matching finish process 246. By referring to the relevant consistency information and read IDs assigned to the read processes at the time when the read finish process 214 is performed, consistency judgment of reading is performed, and success or failure in reading is judged.

Figure 5:
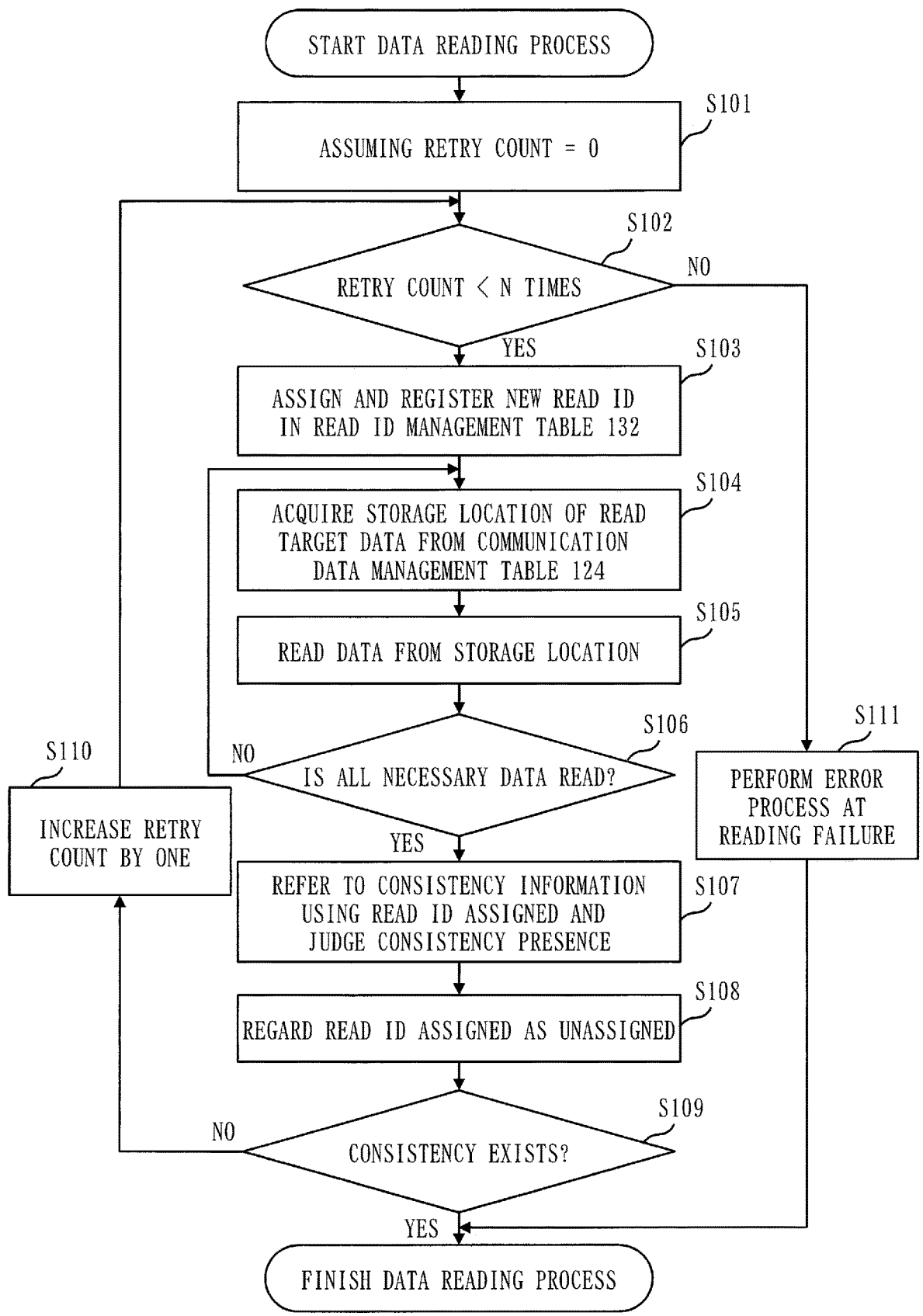
FIG. 5 is a flowchart illustrating one example of a processing sequence of a data reading processing unit 210 according to the first embodiment of the present invention.

Explanation will be provided of a processing sequence in the data reading processing unit 210 using FIG. 5. A consistency judgment method will be described below in detail.

First, it is assumed that a retry count is 0 in a read start process 211 (step S101). By adding the retry count by one every time data reading fails, and by using the retry count for judging whether the retry count has reached a specified number of times before reading, the retry count is used for determining the maximum retry count of reading.

Next, it is confirmed whether the retry count has reached the number of times determined beforehand (step S102). Specifically, as the maximum retry count, N (N is a natural number not smaller than 2) time is set beforehand, and the retry count is compared with N time being the maximum retry count, and when the retry count is smaller, procedure is shifted to a step S103; meanwhile, when N times being the maximum retry count is the same as the retry count, error processing at the time of reading failure, such as notifying reading failure to a caller of the data reading processing unit 210 as required, etc. is performed (step S111), and procedure is finished deeming data reading unsuccessful.

In the step S103, a new read ID is assigned to a reading process that is started in the read matching start process 212, and the new read ID is registered in the read ID management table 132 of the consistency information storage unit 230. An example of the management table of read IDs assigned is illustrated in FIG. 6. Specifically, a read ID is assigned to a set of one or more target data for which a reading request has been made from the application block 201, and as the value, a value after the read ID number is incremented is assigned.

As described, since the read ID is assigned to a reading process, a plurality of pieces of target data read in one read process are managed as one set, and it is possible to judge consistency of reading.

Here, the reading-in-progress ID number is also incremented.

Next, in a reading process 213, storage locations of read target data inside the communication data database 131 are retrieved from the communication data management table 124 (step S104) and received data is read based on the location information (step S105).

In a step S106, whether all pieces of the read target data with a same read ID are read or not in the read finish process 214 is judged. When there is still read target data, procedure is returned to the step S104 and the step S105, and the target data is further read. When all pieces of read target data are read, procedure is shifted to a step S107. Necessary data here is a set of target data for which a reading request has been made from the application block 201, which is judged by, for example, the read ID management table 132 in FIG. 6.

In the step S107, consistency information of the consistency information database 134 is referred to by using read ID assigned in the step S103, and consistency is judged in the read matching finish process 215. Next, the number of read IDs assigned which are being read is decreased by 1 by decrementing the reading-in-progress ID number, and further, by deleting information on the corresponding read ID, the read ID assigned is regarded as unassigned (step S108). Here, when the reading-in-progress ID number after decrement becomes 0, the read ID number also becomes 0. Therefore, even when it is judged that there is no consistency in reading, if there is no other read process during reading, the read ID number becomes 0.

In a judgement processing step S109, processing to transfer is judged by presence of consistency judged in the step S107. When it is judged in the step S107 that consistency does not exist, the retry count is increased by 1 (step S110), and procedure returns to judgment in the step S102. When it is judged that consistency exists in the step S107, procedure is finished deeming reading successful.

Although the processing sequence in the data reading processing unit 210 is described in FIG. 5, a processing sequence is not limited to the same. For example, when it is judged that consistency does not exist in the step S109, procedure is returned to the step S102 and reading is performed again; however, it may be applicable to let a processing sequence be a processing sequence wherein the processing related to retry is omitted, and procedure is shifted to a step S111 deeming reading unsuccessful.

The processing sequence in the data writing processing unit 240 will be discussed using FIG. 7.

First, by starting a writing processing in the write start process 241, and incrementing the write-start count in the write matching start process 242, start of received data writing is recorded in the consistency information database 134 (step S201). In this way, it is managed that preparation to write is made.

In a step S202, a new write ID is assigned to a writing process started in the write matching start process 242, and the new write ID is registered in the write ID management table 133 in the consistency information storage unit 230. An example of the management table of write IDs assigned is illustrated in FIG. 8. Specifically, a write ID is assigned to a set of one or more pieces of target data for which a writing request has been made from the device driver 203, and as the value, a value after incrementing the write-start count is assigned.

In this manner, since a write ID is assigned to a writing process, it is possible to manage a plurality of pieces of target data written in one writing process as one set.

In this manner, since a write ID is assigned to a writing process, it is possible to manage a plurality of pieces of target data written in one writing process as one set.

Next, storage locations inside the communication data database 131 of write target data is retrieved from the communication data management table 124 in the writing process 243 (step S203), and received data is written based on the location information (step S204). Next, information inside the consistency information database 134 is updated in the write matching process 244. Specifically, a data writing-in-progress flag is made to be TRUE, and the read ID number is copied to the writing time ID number (step S205). In this manner, all the data reading by using the read IDs already assigned is judged as not having consistency at the time when the read matching finish process 215 is performed.

In a step S206, it is judged all the pieces of write target data which is requested from the device driver 203 in the write finish process 245 have been written or not. If there is remaining write target data, procedure returns to the step S203, the step S204 and the step S205, and target data is further written. When all data of write target is written, procedure is shifted to a step S207. Necessary data here is a set of target data for which a writing request has been made from the device driver 203, and is judged by the write ID management table 133 in FIG. 8, for example.

In the step S207, by decrementing the write-start count in the write matching finish process 246, information on start of received data writing recorded in the step S201 is deleted from the consistency information database 134. Next, data writing is finished deeming writing successful.

Figure 7:
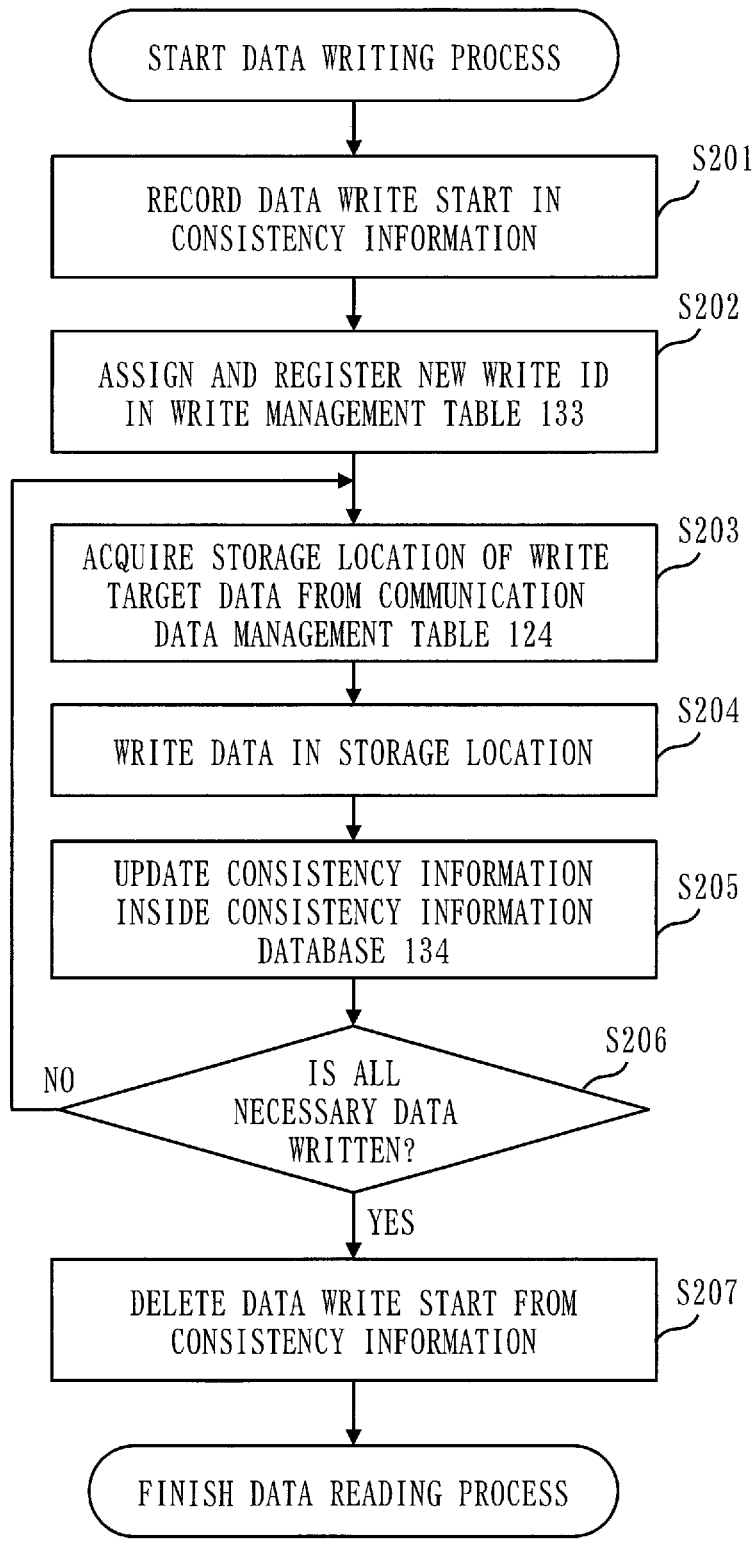
FIG. 7 is a flowchart illustrating one example of a processing sequence of a data writing processing unit 240 according to the first embodiment of the present invention.

In the processing sequence of the data writing processing unit 240, timing to update consistency information regarding data writing is not limited to the timing as illustrated in FIG. 7. For example, the step S205 to reflect data writing to the consistency information may be performed before the writing step S204 of received data.

Specific examples of an update method inside the consistency information database 134, an assignment method of read IDs, and a consistency judgment method will be discussed using FIG. 9 through FIG. 18. Here, values updated with respect to consistency information are underlined in the diagrams.

Here, whether consistency exists or not is judged by a data writing-in-progress flag, and by comparing read IDs associated with target data and the writing time ID number at the time of performing a read matching finish process 215. Specifically, in a case wherein a data writing-in-progress flag at the time of performing the read matching finish process 215 is FALSE, and the read IDs are larger than the writing time ID number, it is judged that consistency exists; in the other cases, it is judged that consistency does not exist.

This means to confirm that data writing is not in progress (a state wherein writing is performed, and a writing executable state is maintained) and writing of the data has been finished at the time when reading of data being a consistency judgment target is finished, and that reading of data being a consistency judgment target has not been started at the time of writing since a read ID is larger than a writing time ID number, according to the read ID indicating what number a reading process corresponding to consistency judgment target data has been started, and the writing time ID number indicating what number reading process has been started at the time of data writing performed for the last time. The reason for confirming that data writing is not in progress (a state wherein writing is performed, and a writing executable state is maintained) is that writing may be performed whenever in this state, and for the purpose of preventing error in consistency judgment that may occur due to an update status of consistency information, etc.

FIG. 9 is an example of a case wherein reading taking (B) through (D) as a set, reading taking (C) through (H) as a set, and writing taking (E), (F) and (G) as a set are performed, and writing is performed at the timing between (D) and (H). In this case, it is expected that, since writing is not performed between (B) through (D), it is judged that consistency exists in (D), and since writing is performed between (C) through (H), it is judged that consistency does not exist in (H).

A precondition wherein reading nor writing is not performed from initial values of each data is indicated in (A). Here, when a read matching start process 212 of the first time is performed, the contents of the consistency information is updated to (B) according to the rule as described above, wherein 1 as a value of the read ID number after increment is assigned to the read ID. Next, when read matching start process 212 of the second time is performed, the contents of the consistency information is updated to (C), wherein 2 is assigned to the read ID. Next, in (D), a read matching finish process 215 is performed, and whether consistency exists is judged. First, a data writing-in-progress flag and a writing time ID number are acquired from consistency information (here, the contents at a time in point of (C)) before the contents are updated by the read matching finish process 215. Since the data writing in-progress flag is FALSE, and the read ID assigned is 1 while the writing time ID number is 0, hence the value of the read ID is larger, it is judged that consistency exists. After judgment, the contents of the consistency information becomes (D). Next, a writing process is performed, and the contents of the consistency information is updated to (E), (F) and (G) in accordance with the rule as described above. In the next (H), the read matching finish process 215 is performed as in (D), wherein whether consistency exists is judged, and a data writing-in-progress flag and a writing-time ID number are referred to in (G). Here, since the data writing-in-progress flag becomes FALSE, and the read ID becomes 2 while the writing time ID number becomes 2, hence the read ID and the writing time ID number are the same, and the condition for consistency presence is not fulfilled, it is judged that consistency does not exist. After judgment, the contents of the consistency information becomes (H).

As results of judgment at the time when the read finish processes 214 in (D) and (H) are performed as described above, reading taking (B) through (D) as a set is judged to have consistency, and reading taking (C) through (H) as a set is judged not to have consistency, which are judgment results as expected.

Explanation is provided of an example in a case wherein start of writing is included in the period from start of reading to finish, using FIG. 10. In this example, since writing is actually performed after (D) although writing is started between (B) through (D), it is expected that consistency is judged to exist.

When consistency information inside the consistency information database 134 is updated in accordance with the rule as described above, in the consistency information of (C) referenced at the time of consistency judgment when reading is finished in (D), the data writing-in-progress flag becomes FALSE, and the read ID assigned becomes 1 while the writing time ID number becomes 0, hence the value of the read ID becomes larger; therefore, it is judged that there is consistency in reading. This result is a judgment result as expected.

Explanation is provided of an example of a case wherein writing is included in the period from start to finish of reading, using FIG. 11. In this example, since writing is performed in the period from start to finish of reading, it is expected that consistency is judged not to exist.

When consistency information inside the consistency information database 134 is updated in accordance with the rule as described above, in the consistency information of (D) referenced at the time of judging consistency in (E), the data writing-in-progress flag becomes TRUE, and the read ID assigned becomes 1 while the writing time ID number becomes 1; thus, since the data writing-in-progress flag is not FALSE, and further, the read ID and the writing time ID number are the same, and the condition for consistency presence is not fulfilled, it is judged that consistency does not exist. This result is a judgment result as expected.

Explanation is provided of an example of a case wherein writing finish is included in the period from start to finish of reading, using FIG. 12. In this example, since writing is finished without performing writing during the period until finish of reading, although writing is started at the start point of reading, it is expected that consistency is judged to exist.

When consistency information inside the consistency information database 134 is updated in accordance with the rule as described above, in the consistency information of (E) referenced at the time of consistency judgment in (F), the data writing-in-progress flag becomes FALSE, and the read ID assigned becomes 1 while the writing time ID number becomes 0, hence the value of the read ID becomes larger; therefore, it is judged that consistency exists. This result is a judgment result as expected.

Explanation is provided of an example of a case wherein only start of writing and writing are included in the period from start to finish of reading, using FIG. 13. In this example, since data writing is performed between (B) through (E), it is expected that consistency is judged not to exist.

When consistency information inside the consistency information database 134 is updated in accordance with the rule as described above, in the consistency information of (D) referenced at the time of consistency judgment in (E), the data writing-in-progress flag becomes TRUE, and the read ID assigned becomes 1 while the writing time ID number becomes 1, hence the data writing-in-progress flag is not FALSE, and further, the read ID and the writing time ID number are the same; thus, since conditions for consistency presence are not fulfilled, it is judged that consistency does not exist. This result is a judgment result as expected.

Explanation is provided of an example of a case wherein writing and finish of writing are included in the period from start to finish of reading, using FIG. 14. In this example, since data writing is performed between (C) and (D), it is expected that consistency is judged not to exist.

When consistency information inside the consistency information database 134 is updated in accordance with the rule as described above, in the consistency information of (E) referenced at the time of consistency judgment in (F), the data writing-in-progress flag becomes FALSE, the read ID assigned becomes 1, the writing time ID number becomes 1, hence the read ID and the writing time ID number are the same, and conditions for consistency presence is not fulfilled; therefore, it is judged that consistency does not exist. This result is a judgment result as expected.

Explanation is provided of an example of a case wherein start of reading and finish of reading are included in the period from start of writing to writing, using FIG. 15. In this example, since reading is finished before writing of the first time (E) after the start of writing, although writing is started at the start time of reading, it is expected that consistency presence is judged.

When consistency information inside the consistency information database 134 is updated in accordance with the rule as described above, in the consistency information of (C) referenced at the time of consistency judgment in (D), the data writing-in-progress flag becomes FALSE, and the read ID assigned becomes 1 while the writing time ID number becomes 0, hence the value of the read ID becomes larger than the writing time ID number; thus, it is judged that consistency exists. This result is a judgment result as expected.

Explanation is provided of an example of a case wherein start of reading and finish of reading are included in the period from writing to finish of writing, using FIG. 16. In this example, since reading is performed after writing of the last time (C) between (B) and (F), it seems that consistency is judged to exist; however, since it is unclear whether (C) is the last writing at the time of (E) performing consistency judgement, it is expected that consistency is judged not to exist.

When consistency information inside the consistency information database 134 is updated in accordance with the rule as described above, in the consistency information of (D) referenced at the time of consistency judgment in (E), the data writing-in-progress flag becomes TRUE, and the read ID assigned becomes 1 while the writing time ID number becomes 0, hence, the data writing-in-progress flag is not FALSE, and conditions for consistency presence are not fulfilled; therefore, it is judged that consistency does not exist. This result is a judgment result as expected.

Explanation is provided of an example of a case wherein reading taking (B) through (G) as a set, reading taking (E) through (H) as a set, and writing taking (C), (D) and (F) as a set are performed, and writing is performed at a timing between (B) and (E), using FIG. 17. In this example, it is expected that reading between (B) and (G) is judged not to have consistency since data is written between (B) and (G), and reading between (E) and (H) is judged to have consistency since writing is not performed and writing is finished between (E) and (H) until finish of reading.

When consistency information inside the consistency information database 134 is updated in accordance with the rule as described above, in the consistency information of (F) referenced at the time of consistency judgment in (G), the data writing-in-progress flag becomes FALSE, and the read ID assigned becomes 1 while the writing time ID number becomes 1, hence the read ID and the writing time ID number are the same, and conditions for consistency presence are not fulfilled; therefore, it is judged that consistency does not exist. Further, in consistency information of (G) referenced at the time of consistency judgment in (H), the data writing-in-progress flag becomes FALSE, and the read ID assigned becomes 2 while the writing time ID number becomes 1, hence the value of the read ID is larger; therefore, it is judged that consistency exists.

As described above, as results of judgement at the execution time of the read finish processes 214 of (D) and (H), reading taking (B) through (G) as a set is judged not to have consistency, and reading taking (E) through (H) as a set is judged to have consistency, which are judgment results as expected.

Explanation is provided of an example of a case wherein start of writing and finish of writing are included, and further, writing is included for two times, in the period from start to finish of reading, using FIG. 18. In this example, since writing is performed between (B) and (G), it is expected that consistency is judged not to exist.

When consistency information inside the consistency information database 134 is updated in accordance with the rule as described above, since writing is performed for two times in (D) and (E), the data writing-in-progress flags and the writing time ID numbers are updated in each. In the consistency information of (F) referenced at the time of consistency judgement in (G), the data writing-in-progress flag becomes FALSE, and the read ID assigned becomes 1 while the writing time ID number becomes 1, hence the read ID and the writing time ID number are the same, and conditions for consistency presence are not fulfilled; therefore, it is judged that consistency does not exist.

As described above, in any examples, when received data is acquired from the application block 201, it is possible to judge consistency of the received data. When there is no consistency, by retrying reading, and repeating reading until data having consistency is read, it is possible to ensure that the data read has consistency. Further, since writing of received data from the device driver 203 is made to precede a reading process of received data from the application block 201, the processing of the device driver 203 is prevented from waiting the processing of the application block 201, and it becomes easy for the processing of the device driver 203 to ensure the timing of the processing specified by a communication device and a communication protocol.

In the description above, explanation is provided of the case wherein data received by a communication device is read by an application block; however, the present invention is not limited to this. For example, it is also applicable to a case wherein data obtained by several kinds of sensors is recorded in a memory, and the data is used by an application block, and so on.

Further, the consistency information database 134 added for judgment of consistency presence or absence in the embodiment of the present invention is small in size, which does not duplex communication data nor degrades memory use efficiency as in the technique illustrated in Patent Literature 2. Therefore, it is possible to easily apply the consistency information database 134 to a product or a system including a small-scale memory which does not allow duplex of communication data.

As described above, since the embedded system 100 of the first embodiment is configured to judge consistency presence or absence of a reading process taking one or more pieces of data as targets, it is possible to ensure that consistency exists in a plurality of data read, and to obtain an effect that control without any malfunction is made possible, according to the embedded system 100.

Second Embodiment

In the first embodiment, explanation is provided of the embodiment wherein when writing is performed between start and finish of reading, it is judged failure in reading in all cases, and retry is required. In a second embodiment, explanation is provided of an embodiment which is possible to judge consistency presence or absence more suitably by judging failure in reading only when data relevant to consistency of data read is written.

Specifically, it is realized by classifying data inside the communication data database 131 into several groups relative to consistency, and in a case wherein data being a reading target requested by the application block 201 and data being a writing target requested by the device driver 203 belong to different groups, by not judging failure in reading even reading or writing occurs simultaneously. As a result, it is possible to reduce the occurrence frequency of reading retry.

Figure 19:
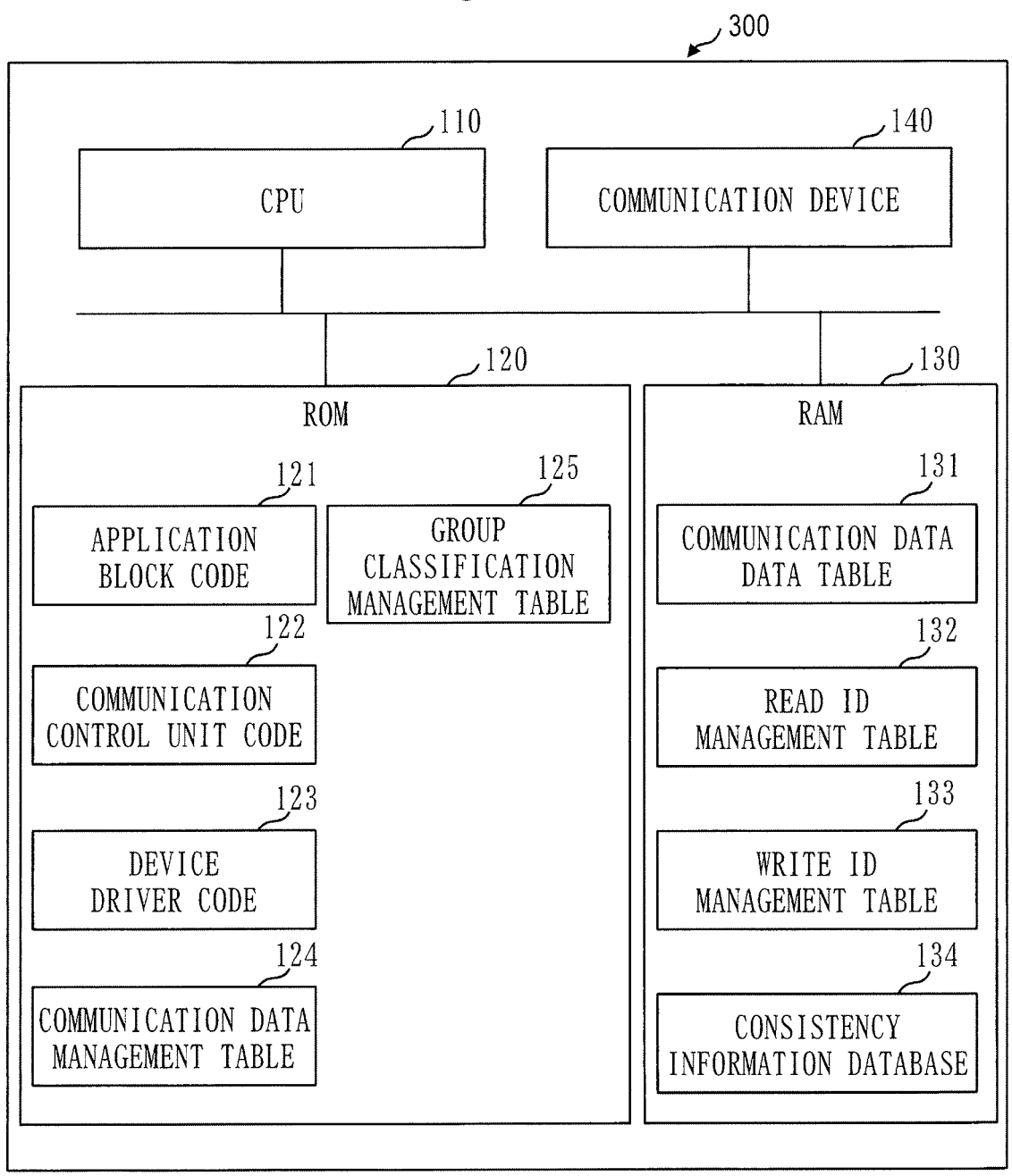
FIG. 19 is a configuration diagram illustrating one example of a system configuration of an embedded system 300 according to a second embodiment of the present invention.
Figure 20:
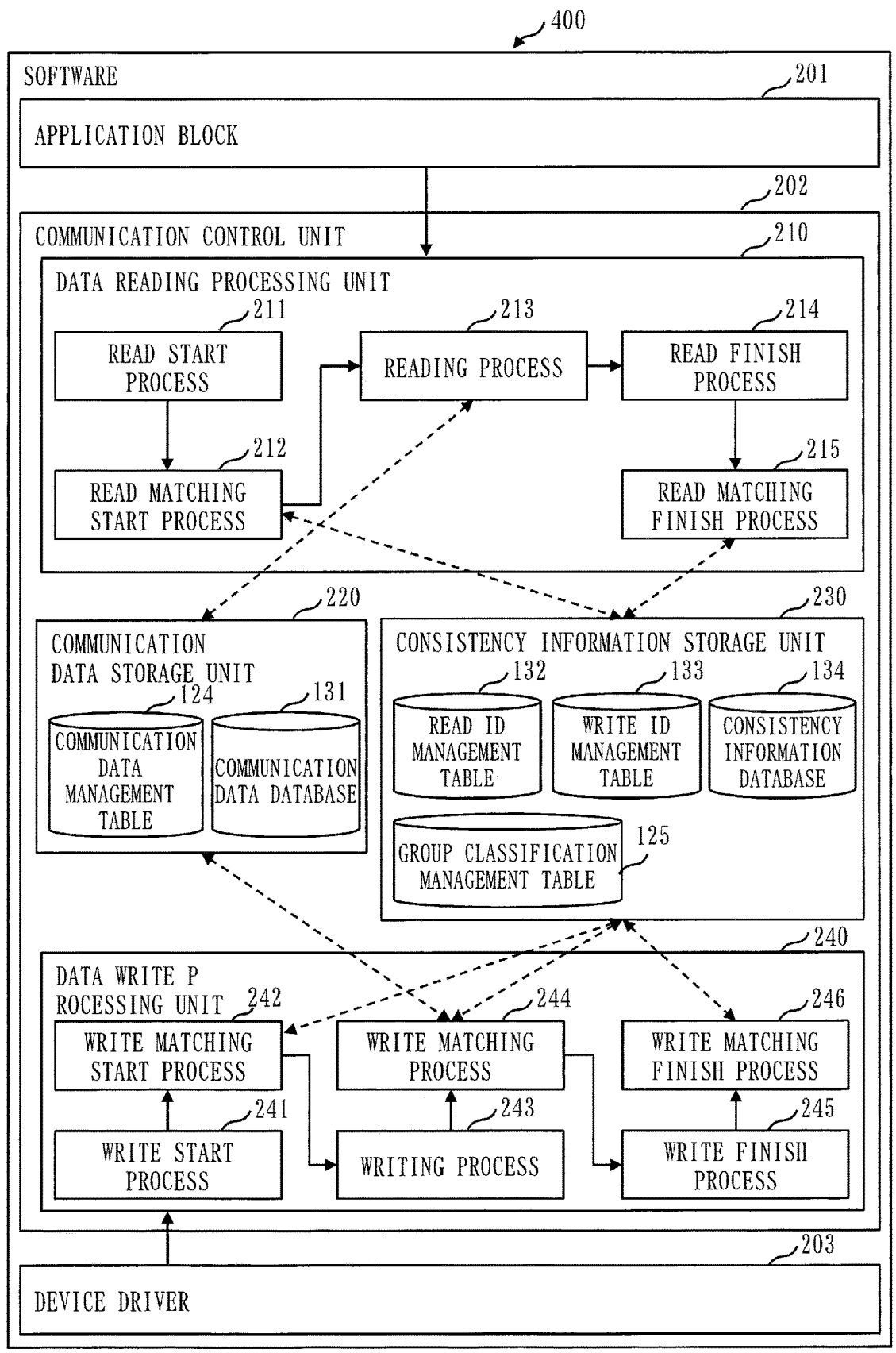
FIG. 20 is a configuration diagram illustrating one example of a software configuration of software 400 in an embedded system according to the second embodiment of the present invention.

FIG. 19 is a configuration diagram illustrating one example of a system configuration of an embedded system 300 according to the second embodiment of the present invention, and FIG. 20 is a configuration diagram illustrating one example of a software configuration of software 400 of an embedded system according to the second embodiment of the present invention.

In FIG. 19, the embedded system 300 is different from the embedded system 100 of the first embodiment in that a ROM 120 stores a group classification management table 125, and the other components are the same.

Further, in FIG. 20, the software 400 of the embedded system is different from the software 200 of the embedded system of the first embodiment in that a consistency information storage unit 230 is equipped with a group classification management table 125, and the other components are the same.

The group classification management table 125 is a management table of a group wherein data inside the communication data database 131 is classified into data relative to consistency, and an example of the data structure is illustrated in FIG. 21. The embedded system 300 specifies a group to be a target, by referencing the group classification management table 125 at the time of performing a read start process 211 by the data reading processing unit 210 and a write start process 241 by the data writing process unit 240, and when the consistency information database 134 is referenced or updated in the following processing, the group specified is used. Accordingly, if groups to be targets are different, even when reading or writing occurs simultaneously, the groups of consistency information used for consistency judgment are different; hence, it is not judged failure in reading.

Further, FIG. 22 is one example of a data structure of consistency information inside the consistency information database 134 in the second embodiment, and the configurations of the consistency information of respective groups are the same as those in the first embodiment as illustrated in FIG. 4. FIG. 21 and FIG. 22 present cases as examples wherein a whole of the communication data is divided into four groups; meanwhile, the number of groups to be divided into can be arbitrarily selected. Further, as for a classification of groups, it may be applicable to classify for every product or system being an object such as a room air conditioner, a television, etc., or for every process being an object, such as an air conditioning setting change process, etc.

Since the components other than the group classification management table 125 in FIG. 19 and FIG. 20 are the same as those in FIG. 1 and FIG. 2 of the first embodiment, for which detailed explanation is omitted.

Explanation is provided of a processing sequence in the data reading processing unit 210 in the second embodiment, using FIG. 23.

The difference from FIG. 5 where communication data is not divided into groups is that a process to select a group being a reading target from consistency information illustrated in FIG. 22 (step S301) is added, and the other processes (from a step S302 through a step S312) are processes corresponding to the step S101 through the step S111 in FIG. 5, respectively. However, in the processes related to consistency information (a step S304, a step S308 and a step S309), consistency information of the group selected in the step S301 is used.

First, a group being a reading target is selected in a read start process 211 (step S301). Specifically, by referencing FIG. 21, an object group of data for which a reading request has been made from the application block 201 is specified, and by referencing FIG. 22, consistency information of the object group is selected. The object group in the consistency information selected is referenced or updated in the following processing. Next, procedure proceeds to a process to make the retry count be 0 (step S302), a process to confirm whether the retry count reaches the number of times determined beforehand (step S303), and an error process at the time of reading failure when the retry count reaches N times being the maximum retry count set beforehand (step S312). Since these processes are processes corresponding to the steps S101, S102 and S111 in FIG. 5, the detailed explanation is omitted.

When the retry count does not reach N times being the maximum retry count in the step S303, procedure proceeds to the step S304. In the step S304, a new read ID is assigned to a reading process started, in the read matching start process 212, and is registered in the read ID management table 132 of the consistency information storage unit 230. Here, the reading-in-progress ID number is also incremented. Since this processing is processing corresponding to the step S103 in FIG. 5, the detailed explanation is omitted.

As for the read ID, one ID is assigned to reading target data belonging to a same group. If it is necessary to read data of a plurality of groups simultaneously, a read ID is assigned for each group, and is respectively managed separately.

Next, storage locations inside the communication data database 131 of reading target data is retrieved from the communication data management table 124 in the reading process 213 (step S305), and received data is read based on the location information (step S306). Here, in data reading, only reading target data belonging to a same group is read. If it is necessary to read data of a plurality of groups, the present processing sequence is performed for each group.

In a step S307, it is judged whether all data being a reading target with the same read ID in the same group is read in the read finish process 214. Since this process is a process corresponding to the step S106 in FIG. 5, the detailed explanation is omitted.

The judgment process of consistency presence or absence in the step S308 and the process to make a read ID be unassigned in the step S309 are processes corresponding to the step S107 and the step S108 in FIG. 5, respectively. Therefore, the detailed explanation of the processing is omitted. However, the consistency information referenced here is consistency information of the group selected in S301.

In a judgment processing step S310, a process to proceed to is judged by the consistency presence or absence judged in the step S308. If it is judged that consistency does not exist in the step S310, the retry count is increased (S311) by 1, and procedure returns to judgment in the step S303. If it is judged that consistency exists in the step S310, procedure is finished deeming reading successful.

The processing sequence in the data reading processing unit 210 is described in FIG. 23; however, the processing sequence is not limited to the description. For example, if it is judged that consistency does not exist in the step S310, procedure returns to the step S303, and reading is performed again; however, it may be applicable to adopt a processing sequence wherein the processing regarding retry is omitted, and procedure is shifted to the step S312 deeming reading unsuccessful.

A processing sequence in the data writing processing unit 240 according to the second embodiment will be described using FIG. 24.

The difference from FIG. 7 wherein communication data is not divided into groups is that a process to select a group being a writing target from the consistency information illustrated in FIG. 22 is added (step S401), and the other processes (from a step S402 through a step S407) are processes corresponding to the step S201 through the step S206 in FIG. 7, respectively. However, in the processes (the step S402, the step S405 and the step S407) relative to consistency information, information in the line selected in the step S401 is used.

First, consistency information of a group being a writing target is selected in the write start process 241 (step S401). Specifically, a target group of data for which a writing request has been made from the device driver 203 is specified by referring to FIG. 21, and by referring to FIG. 22, consistency information of the target group is selected. Here, the target group in the consistency information selected is referenced or updated in the following processing.

Next, procedure proceeds to a process to record start of received data writing in consistency information in the consistency information database 134, in the write matching start process 242 (step S402), a process to assign a new write ID to the write processing started, and to register the new write ID in the write ID management table 133 of the consistency information storage unit 230 (step S403), a process to read storage locations inside the communication data database 131 of the write target data from the communication data management table 124, in the writing process 243 (step S404), and a process to write received data based on the locations (step S405). These processes are processes corresponding to the steps S201, S202, S203 and S204 in FIG. 7, and the detailed description is omitted. Meanwhile, as for the write ID, one ID is assigned to write target data belonging to a same group. If it is necessary to read data of a plurality of groups simultaneously, write IDs are assigned to respective group, which are managed separately, and the present processing sequence is performed for respective groups.

Next, the consistency information inside the consistency information database 134 is updated in the write matching process 244 (step S406). The process is the process corresponding to the step S205 in FIG. 7, and the detailed description is omitted. Here, the consistency information to be updated here is consistency information of the group selected in the step S401.

In a step S407, it is judged whether all data being a writing target which is requested from the device driver 203 in the write finish process 245, and in the step S408, information on the start of received data writing recorded in the consistency information database 134 in the step S402 is deleted, and data writing is finished deeming writing successful. These processes are the processes corresponding to the step S206 and the step S207 in FIG. 7, and the detailed description is omitted.

In the processing sequence of the data writing processing unit 240, timing to update consistency information regarding data writing is not limited to the timing illustrated in FIG. 24. For example, the step S405 to reflect data writing on the consistency information may be performed before the write step S404 of received data.

As described above, according to the embedded system 100 of the second embodiment, data inside the communication data database 131 is divided into groups relative to consistency judgment, and consistency of read processing taking one or more pieces of data as a target is judged for respective groups; therefore, even in a case wherein reading from the application block 201 and writing from the device driver 203 are performed at the same time, it is possible to make an effect to have consistency be judged to exist when read target data requested from the application block 201 and received data requested from the device driver 203 do not belong to a same group, to suitably judge that consistency exists in a plurality of pieces of data on which the reading process has been performed, and to obtain an effect to make control without any malfunction possible. It is also possible to reduce the possibility of performing redundant processing such as repeating retry, and to improve processing efficiently.

REFERENCE SIGNS LIST 100, 300: embedded system; 110: CPU; 120: ROM; 121: application block code; 122: communication control unit code; 123: device driver code; 124: communication data management table; 125: group classification management table; 130: RAM; 131: communication data database; 132: read ID management table; 133: write ID management table; 134: consistency information database; 140: communication device; 200, 400: software; 201: application block; 202: communication control unit; 203: device driver; 210: data reading processing unit; 211: read start process; 212: read matching start process; 213: reading process; 214: read finish process; 215: read matching finish process; 220: communication data storage unit; 230: consistency information storage unit; 240: data writing processing unit; 241: write start process; 242: write matching start process; 243: writing process; 244: write matching process; 245: write finish process; 246: write matching finish process

The invention claimed is:

1. An embedded system comprising:
processing circuitry to:
start a reading process of data performed by an application unit;
assign a read identification (ID) to each reading process started, and update a read ID number indicating the number of read IDs assigned;
read the data;
finish reading of the data; and
acquire the read ID, a data writing-in-progress flag to indicate whether a writing process is in progress, and a writing time identification (ID) number indicating the read ID number at a time of a data writing process, and judge consistency of the data read, based on the data writing-in-progress flag, the read ID and the writing time ID number.

2. The embedded system as defined in claim 1, wherein the read ID is a numerical value, and
the processing circuitry assigns the read ID after increasing the numerical value by one.

3. The embedded system as defined in claim 2, wherein the processing circuitry performs a data reading process again when it is judged that consistency does not exist in the data read.

4. The embedded system as defined in claim 3,
wherein the read ID, the read ID number, the data writing-in-progress flag and the writing time ID number are divided into a plurality of groups for each data being an object, and
wherein the processing circuitry judges consistency for each of the plurality of groups.

5. The embedded system as defined in claim 2,
wherein the read ID, the read ID number, the data writing-in-progress flag and the writing time ID number are divided into a plurality of groups for each data being an object, and
wherein the processing circuitry judges consistency for each of the plurality of groups.

6. The embedded system as defined in claim 1, wherein the processing circuitry performs a data reading process again when it is judged that consistency does not exist in the data read.

7. The embedded system as defined in claim 6,
wherein the read ID, the read ID number, the data writing-in-progress flag and the writing time ID number are divided into a plurality of groups for each data being an object, and
wherein the processing circuitry judges consistency for each of the plurality of groups.

8. The embedded system as defined in claim 1,
wherein the read ID, the read ID number, the data writing-in-progress flag and the writing time ID number are divided into a plurality of groups for each data being an object, and
wherein the processing circuitry judges consistency for each of the plurality of groups.

9. An embedded system control method to control a data reading process from a shared memory of an embedded system equipped with the shared memory, the embedded system control method comprising:
assigning a read identification (ID) to identify a reading process at a time of starting the data reading process;
reading data from the shared memory;
acquiring consistency information including a read ID number being the number of read IDs assigned form the shared memory at a time of finishing the reading of the data, a data writing-in-progress flag being a flag to denote whether a data writing process into the shared memory is in progress, and a writing time identification (ID) number being the read ID number at a time of the data writing process into the shared memory; and
judging that consistency exists in the data read when the data writing-in-progress flag acquired is not writing-in-progress, and the read ID is larger than the writing time ID number.

10. A data consistency judgment method to judge, in an embedded system equipped with a shared memory, whether consistency exists in data read from the shared memory, the data consistency judgment method judging whether consistency exists in the data read, based on:
a read identification (ID) assigned to identify a read start process at a time of starting a data reading process from the shared memory;
a read ID number indicating a number of read IDs assigned;
a data writing-in-progress flag indicating whether data writing into the shared memory is in progress; and
a writing time identification (ID) number indicating the read ID number at the time of a data writing process.

11. The data consistency judgment method as defined in claim 10, wherein it is judged that consistency exists when the data writing-in-progress flag is not writing-in-progress, and the read ID is larger than the writing time ID number, at the time of finishing a data reading process from the shared memory.

* * * * *